Figure 1:
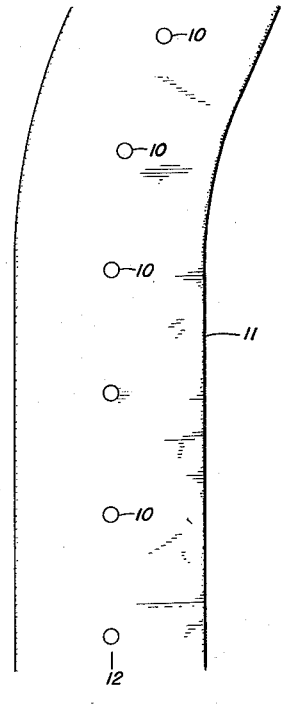

July 9, 1963  B. S. LYNN  3,096,694
GUIDE MARKING FOR JET RUNWAYS
Filed Nov. 16, 1961

Inventor:
Bernard Stanley Lynn
By Henry H Snelling
his Attorney

United States Patent Office
3,096,694
Patented July 9, 1963

3,096,694
GUIDE MARKING FOR JET RUNWAYS
Bernard Stanley Lynn, 19451 Black Road,
Los Gatos, Calif.
Filed Nov. 16, 1961, Ser. No. 152,731
5 Claims. (Cl. 94—1.5)

This invention relates to lines of guide markings suitable for highways but particularly useful for runways used by heavy jet planes. It has for its principal objective the provision of a relatively permanent pavement marker which can readily be seen by the pilot of a plane or driver of a vehicle, is reasonably low in initial outlay and has an exceptionally low cost of yearly maintenance as it will outwear a painted centerline mark many times, requires no cleaning, and will not be covered by tire rubber in the touch-down areas.

At present time, painted centerlines on busy jet airport runways are very unsatisfactory because the paint, within a matter of a few weeks after application is completely obliterated by an opaque film of black rubber from the impacting tires of the landing aircraft. This phenomenon occurs usually in the touch-down area, which is the first 3,000 to 4,000 feet of runway on the approach end.

As a typical example of unsatisfactory performance, the center stripe three feet wide was recently repainted at a Strategic Air Command bomber base in California. Within three weeks after repainting, the first 3000 feet of centerline on the approach end was completely covered with black "vulcanized" rubber and rendered useless. As it is important for the pilot to aline the aircraft with the centerline at start of takeoff and at landing impact; and as these important operations occur in this first 3000 feet, it is apparent that painted centerlines in this area are practically worthless and a waste of time and money. It is to be noted that it is in this area the pilot most needs the centerline markings, and my invention will be found particularly valuable for permanently maintaining a non-eraseable bright guideline in this critical area.

According to my invention, the guide line marking made of spaced separate sheets or tiles will not be obliterated at all for there will be no rubber build-up due to impact of the tires upon landing or in decelerating because the tiles are made of Teflon which is tetrafluoroethylene, as that material and certain similar resins have the unique property of not adhering to most known substances. Repeated tests show that automobile and airplane tire rubber even at high temperatures and heavy pressure will not stick to such materials, consequently the white surface of Teflon will still show brightly after extended months of use and lines made with such tiles aid in guiding the planes safely for a period as long as 3 to 5 years, making the cost per year of the lines of marking, even with the relatively high price of Teflon, only a fraction of the cost of painting the lines for the same period of time.

Figure 3:
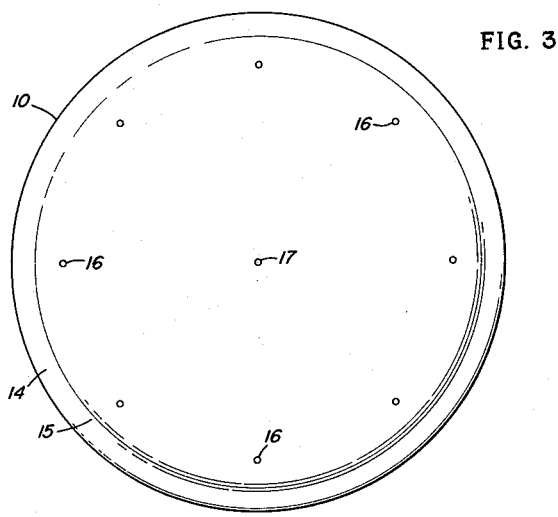
Figure 2:
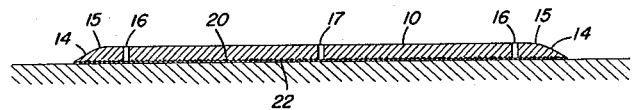
Figure 4:
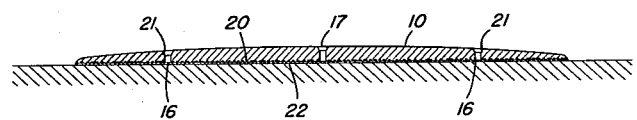
Figure 5:
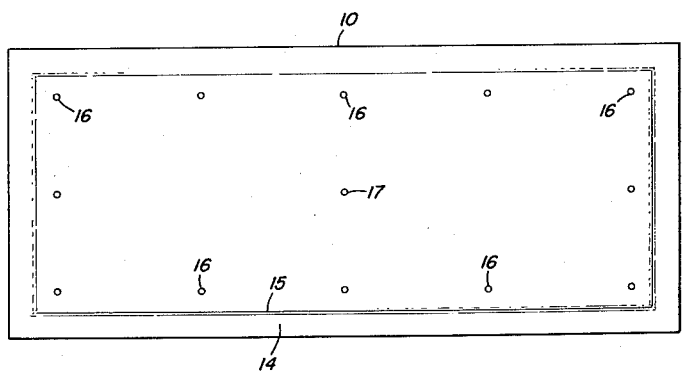

In the drawings,
FIG. 1 is a plan view of a highway;
FIG. 2 is a central section through a tile of my invention;
FIG. 3 is a plan view thereof;
FIG. 4 is a section through a modification;
FIG. 5 is a plan view of another of many alternative forms of the marker tile.

FIG. 1 shows a highway 11 carrying a center line 12 formed of a plurality of tiles 10 firmly secured to the pavement at intervals of from ten to twenty foot spacing.

In FIG. 2 the tile 10 is made of a material having the property known as "anti-stick" the best known member of this family being Teflon, manufactured by E. I. du Pont de Nemours & Co., sold under the trademark of "Teflon" and is a polymer of tetrafluorocarbon resin. An excellent substitute manufactured by Minnesota Mining & Manufacturing Co., is trifluorochloroethylene sold under the trademark "Kel–F."

A great number of other materials such as glazed tile, polyethylene, Plexiglas and vinyl have been tried but in each of these substitutes it was found that under certain pressures and temperatures the tire rubber would stick to the sample tile and build up so that the original surface of the material would be hidden before long by a black coat of rubber.

The tiles are formed from Teflon as white as can be obtained, although the less pure and therefore lower priced Teflon is suitable, as the surface of such commercial Teflon, while not dead white is of a bright color having a bluish tinge. The tiles may be formed by molding, cutting, skiving or otherwise. The minimum thickness should be at least a twentieth of an inch at the highest point but better somewhere in the neighborhood of a sixteenth of an inch as a tile thinner than that is translucent and does not always give the desired clear white appearance, for it is apt to show the darker color of etched area which is due to the deposit of the carbon of the resin.

On the other hand, while the tile can be of considerable thickness, as the thicker the tile the more densely white the appearance, I find it advisable to have the tile thicker than sixteen hundredths of an inch and preferably restricted to a thickness of 1/8", as tiles of the latter dimension give only slight bumps as the airplane tires strike them, whereas heavier tile tend to create excessive jarring. The impact blow is preferably reduced by sloping the sides of the tile as at 14 and smoothly rounding off the junction as at 15.

Experience indicates that the tile is perhaps most satisfactory when it is a disk of about 10" in diameter, flat on the top or with its upper domed surface smoothly curved as shown in FIG. 4, the vertical cross section corresponding closely to that of a quoit but naturally with the center hole omitted. The margin angle should not be too sharp, 30° to 45° being satisfactory.

In FIG. 5 the tile is shown as oblong with a plurality of holes 16 completely through the tile. These holes are preferably but not necessarily made small in diameter and may vary in number from four to perhaps a dozen or more. These will be described later.

After the tiles or sheets have been produced they are treated on the pavement-contacting side with a suspension of metallic sodium held in ammonia, which metal etches or pits this under surface to allow for entry of an adhesive. Without such etching it does not seem possible to secure the tile to the pavement in satisfactory fashion. The pitting results in the creation of a great number of tiny passageways, such as 20, which extend vertically upward from the base 22 of the tile. Metallic potassium may be used for the pitting instead of the preferred sodium.

The adhesive which I have found able to survive repeated landings and therefore hold the marker in place permanently is an epoxy resin. This is a readily obtainable commercial product sold in two parts, one the epoxy resin itself and the other a hardener. These are mixed just before using. The epoxy resin cement has perfectly marvelous adhesive power when used between two smooth hard surfaces but like almost every other material it will not stick to a smooth surface of a fluorocarbon tile of the type previously described; but does adhere firmly to the etched surface and of course cements nicely to the pavement whether it be of asphalt, concrete or other usual pavement material.

The holes 16, often eight in number about the periphery are for the purpose of increasing the adhesion obtained by applying the epoxy base resin to the pavement and to the etched surface of the base 22 of the tile. The holes 16 may be formed in any desired way, for example, molding, punching, drilling the disk or other shaped tile. These holes may be countersunk, if desired or tapered as at 21 in FIG. 4. I prefer to have one hole such as 17 in the center of the tile and to have the other spaced holes parallel to the margin. The size of these holes 16 may be as great as 3/16" but preferably less, and should be at least as large as 1/10" in diameter. While it is much preferred that these auxiliary holes should extend completely through the tile this is not absolutely necessary.

When the holes do extend all the way through, it is usual for the epoxy resin adhesive to rise completely above the surface to form a convex head like a rivet, and all holes will be filled with what may be called "epoxy rivets." The rubber which may adhere to the upper head of the rivet is not at all an objection because on impact only a thin film of rubber is deposited, and this rubber appears as a small black dot which does not interfere with seeing the marker either during the day or at night. As previously stated, while these auxiliary holes 16 may be used alone, it is much preferred to use the two means together, that is, the attachment provided by the under surface of the tile etched or pitted by an alkaline metal having a single chemical valence and also the peripherally spaced epoxy rivets. In this manner it is possible to insure a permanency not as completely guaranteed by either feature alone.

In preparing the guide lines, the locations of disks are marked; the two part epoxy adhesive is mixed and spread in a thin film on the etched side of the disk and on the matching area of the pavement. The tile whether round, square, oblong or of other shape, is carefully placed and a weight of at least 15 pounds is placed on the tile in such a manner as to avoid contact with the adhesive which squeezes up through the holes. They are left for at least an hour until the adhesive has set. It is recommended that the centerline portion of the runway not be used for about 24 hours after placing the tiles to permit adequate curing. The epoxy adhesive used is the clear type which must be mixed according to directions as supplied by Richold Chemicals, Inc.

When the uniformly spaced tiles are properly secured in place they then form a permanent guideline along the center of the runway which is effective in daylight, as well as at night when the landing lights pick up the reflective white markers.

What I claim is:

1. The method of forming a guide line on a pavement comprising forming fluorocarbon resin tiles of a thickness between .06" and 0.2", said fluorocarbon resin being selected from the group consisting of tetrafluoroethylene resin and trifluorochloroethylene resin, pitting the lower surface of the tiles, and securing the tiles to the pavement by means of an epoxy base resin adhesive.

2. The method of claim 1 including forming the tiles with spaced auxiliary holes extending through the tiles, applying the epoxy resin adhesive separately to the tiles and to the pavement, and pressing the tiles to the pavement until firmly attached, whereby the adhesive extends above each auxiliary hole forming an epoxy rivet head.

3. A runway marking comprising a pavement having a hard surface, a tile of a fluorocarbon resin selected from the group consisting of tetrafluoroethylene resin and trifluorochloroethylene resin, the lower surface of said tiles being pitted, and an epoxy adhesive extending into said pits and bonding the tile to the pavement.

4. The marking of claim 3 in which the tile has a plurality of auxiliary holes perpendicular to the pavement engaging surface, and is of a thickness between .04" and 0.4".

5. The marking of claim 4 in which the tile sides slope at an angle between 30° and 45°, the auxiliary holes extend completely through the tile in a line parallel to its periphery and are outwardly flared at their tops so the adhesive forms epoxy rivet heads.

References Cited in the file of this patent

UNITED STATES PATENTS

| | | |
|---|---|---|
| 2,562,117 | Osdal | July 24, 1951 |
| 2,699,982 | Batterson | Jan. 18, 1955 |
| 2,745,885 | Ruh | May 15, 1956 |
| 2,951,001 | Rubenstein | Aug. 30, 1960 |
| 3,031,437 | Iserson | Apr. 24, 1962 |

OTHER REFERENCES

Traffic Line Markers, reprint from California Highways and Public Works, May–June 1955, 3 pp.

Du Pont Bulletin, A–9863—3M—7–55, Sept. 1955, pp. 1–5.

The Condensed Chemical Dictionary, 5th edition, by the Reinhold Publishing Co., New York, 1956, page 1067.